United States Patent
Bauknecht et al.

(10) Patent No.: US 8,210,981 B2
(45) Date of Patent: Jul. 3, 2012

(54) MULTI-STAGE GEARBOX

(75) Inventors: Gert Bauknecht, Friedrichshafen (DE);
Gerhard Gumpoltsberger,
Friedrichshafen (DE); Peter Ziemer,
Tettnang (DE); Mark Mohr, Tettnang
(DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 187 days.

(21) Appl. No.: 12/919,349

(22) PCT Filed: Feb. 4, 2009

(86) PCT No.: PCT/EP2009/051227
§ 371 (c)(1),
(2), (4) Date: Aug. 25, 2010

(87) PCT Pub. No.: WO2009/106408
PCT Pub. Date: Sep. 3, 2009

(65) Prior Publication Data
US 2011/0009228 A1    Jan. 13, 2011

(30) Foreign Application Priority Data
Feb. 28, 2008   (DE) .......................... 10 2008 000 428

(51) Int. Cl.
*F16H 3/62*    (2006.01)
(52) U.S. Cl. ....................... 475/275; 475/282
(58) Field of Classification Search .................. 475/275, 475/282, 296
See application file for complete search history.

(56) References Cited

U.S. PATENT DOCUMENTS

| | | | |
|---|---|---|---|
| 4,395,925 A | 8/1983 | Gaus | |
| 5,106,352 A | 4/1992 | Lepelletier | |
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,860,831 B2 | 3/2005 | Ziemer | |
| 6,955,627 B2 | 10/2005 | Thomas et al. | |
| 6,960,149 B2 | 11/2005 | Ziemer | |

(Continued)

FOREIGN PATENT DOCUMENTS
DE    29 36 969 A1    4/1981
(Continued)

OTHER PUBLICATIONS

Gumpoltsberger, Gerhard: Systematic Synthesis and Evaluation of Multi-Stage Planetary Transmissions, Dissertation TU Chemnitz, 2007 pp. 1-210.

(Continued)

*Primary Examiner* — Edwin A Young
(74) *Attorney, Agent, or Firm* — Davis & Bujold, P.L.L.C.

(57) ABSTRACT

A multi-stage transmission comprises planetary gearsets (P1, P2, P3, P4), shafts and shift elements. The carriers of gearsets (P1, P2) couple via shaft (4) which couples the sun gear of gearset (P3). The ring gear of the gearset (P1) couples the sun gear of gearset (P2) via shaft (8), which couples drive shaft (1) via clutch (18). The sun gear of gearset (P1) couples housing (G) by shaft (3) via brake (03), and shaft (1) via clutch (13). The ring gear of gearset (P2) couples housing (G) by shaft (5) via brake (05). The sun gear of gearset (P4) couples housing (G). Shaft (6) couples shaft (1) via clutch (16) and carrier of gearset (P3). Shaft (9) couples shaft (4) via clutch (49) and the ring gear of gearset (P4). Output shaft (2) couples the ring gear and the carrier respectively of gearsets (P3, P4).

16 Claims, 4 Drawing Sheets

U.S. PATENT DOCUMENTS

| | | |
|---|---|---|
| 6,991,578 B2 | 1/2006 | Ziemer |
| 7,549,942 B2 | 6/2009 | Gumpoltsberger |
| 7,556,582 B2 | 7/2009 | Gumpoltsberger |
| 7,566,283 B2 | 7/2009 | Gumpoltsberger |
| 7,699,743 B2 | 4/2010 | Diosi et al. |
| 2007/0072730 A1* | 3/2007 | Shim .............................. 475/275 |
| 2008/0161149 A1 | 7/2008 | Diosi et al. |
| 2009/0011891 A1 | 1/2009 | Phillips et al. |
| 2009/0221394 A1* | 9/2009 | Phillips et al. ................. 475/213 |
| 2010/0048344 A1 | 2/2010 | Kamm et al. |
| 2011/0009228 A1 | 1/2011 | Bauknecht et al. |

FOREIGN PATENT DOCUMENTS

| | | |
|---|---|---|
| DE | 199 12 480 A1 | 9/2000 |
| DE | 199 49 507 A1 | 4/2001 |
| DE | 101 15 983 A1 | 10/2002 |
| DE | 101 15 987 A1 | 10/2002 |
| DE | 101 15 995 A1 | 10/2002 |
| DE | 102 13 820 A1 | 10/2002 |
| DE | 10 2005 010 837 A1 | 9/2005 |
| DE | 10 2004 040 597 A1 | 2/2006 |
| DE | 10 2005 002 337 A1 | 8/2006 |
| DE | 10 2005 010 210 A1 | 9/2006 |
| DE | 10 2005 032 881 A1 | 1/2007 |
| DE | 10 2006 006 622 A1 | 9/2007 |
| DE | 10 2006 006 636 A1 | 9/2007 |
| DE | 10 2006 006 637 A1 | 9/2007 |
| DE | 10 2008 000 428 | 2/2008 |
| DE | 10 2008 007 574 A1 | 8/2008 |
| DE | 10 2008 016 084 A1 | 10/2008 |
| EP | 0 434 525 A1 | 6/1991 |
| JP | 2005061445 A | 3/2005 |
| JP | 2006349153 A | 12/2006 |

OTHER PUBLICATIONS

Gumpoltsberger, Gerhard: Synthesis of Planetary Transmissions, ZF Friedrichshafen AG, 2009, 13 pages, Germany.

* cited by examiner

| GEAR | BRAKE | | CLUTCH | | CLAW | | GEAR RATIO λ | EFFICIENCY η | STEP φ |
|---|---|---|---|---|---|---|---|---|---|
| | 03 | 05 | 13 | 16 | 49 | 18 | | | |
| 1 | | o | | | o | o | 4.00 | 98.1 | 1.68 |
| 2 | o | | | | o | o | 2.37 | 98.6 | 1.56 |
| 3 | | | o | | o | o | 1.53 | 99.3 | 1.27 |
| 4 | | | | o | o | (o) | 1.20 | 99.5 | 1.20 |
| 5 | | | o | o | | o | 1.00 | 100.0 | 1.22 |
| 6 | o | | | o | | o | 0.82 | 99.4 | 1.13 |
| 7 | | o | | o | | o | 0.72 | 99.2 | 1.17 |
| 8 | o | o | | o | | | 0.62 | 99.2 | 1.20 |
| 9 | | o | o | o | | | 0.51 | 98.0 | TOTAL |
| R | | o | o | | o | | -2.92 | 93.4 | 7.8 |

MULTI-STAGE GEARBOX

This application is a National Stage completion of PCT/EP2009/051227 filed Feb. 4, 2009, which claims priority from German patent application serial no. 10 2008 000 428.6 filed Feb. 28, 2008.

FIELD OF THE INVENTION

The present invention relates to a multi-stage transmission of a planetary design, in particular an automatic transmission for a motor vehicle.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch.

A transmission of this type appears in EP 0 434 525 A1. It mainly comprises a drive shaft and an output shaft, which are disposed parallel to each other, a double planetary gear set disposed concentrically to the output shaft, and five shift elements in the form of three clutches and two brakes, the selective engagement of which, in pairs, implements different gear ratios between the drive shaft and the output shaft. The transmission has one front-mounted gear set and two power paths so that six forward gears are attained by the selective engagement of a pair of the five shift elements.

Two clutches are required in the first power path for transmitting torque from the front-mounted gear set to two elements of the double planetary gear set. They are disposed in the power flow direction substantially downstream of the front-mounted gear set in the direction of the double planetary gear set. A further clutch is provided in the second power path, which detachably connects the second power path to a further element of the double planetary gear set. The clutches are disposed in such a manner that the inner lamella carrier forms the output drive.

Furthermore, DE 199 49 507 A1 from the applicant makes known a multi-stage transmission, according to which two non-shiftable front-mounted gear sets are provided on the drive shaft and generate two rotational speeds on the output side, which, in addition to the rotational speed of the drive shaft, can be selectively meshed with a shiftable double planetary gear set acting on the output shaft by selective engagement of the shift elements such that only one of the two currently actuated shift elements must be engaged or disengaged to shift from one gear to the next higher or lower gear.

DE 199 12 480 A1 discloses an automatically shiftable motor vehicle transmission having three single-carrier planetary gear sets, as well as three brakes and two clutches, for shifting six forward gears and one reverse gear, and having a drive shaft and an output shaft. The automatically shiftable motor vehicle transmission is designed such that the drive shaft is directly connected to the sun gear of the second planetary gear set and such that the drive shaft can be connected to the sun gear of the first planetary gear set via the first clutch, and/or to the carrier of the first planetary gear set via the second clutch. Additionally or alternatively, the sun gear of the first planetary gear set can be connected to the housing of the transmission via the first brake, and/or the carrier of the first planetary gear set can be connected to the housing via the second brake, and/or the sun gear of the third planetary gear set is connected to the housing via the third brake.

Furthermore, DE 102 13 820 A1 makes known a multi-speed automatic transmission comprising a first input path T1 of a first transmission ratio; an input path T2 that has a higher transmission ratio than that of input path T1; a planetary gear set with four elements, namely a first element, a second element, a third element and a fourth element in the sequence of elements in a rotational speed diagram; a clutch C-2 which transfers rotation of the input path T2 to the first element S3; a clutch C-1 which transfers rotation from the input path T2 to the fourth element S2; a clutch C-4 which transfers rotation from the input path T1 to the first element; a clutch C-3 which transfers rotation from the input path T1 to the second element C3; a brake B-1 which produces meshing of the fourth element; a brake B-2 which produces meshing of the second element; and an output element which is coupled to the third element R3.

A multi-stage transmission is described in the scope of DE 101 15 983 A1 from the applicant which has a drive shaft that is connected to a front-mounted gear set, an output shaft that is connected to a rear-mounted gear set, and a maximum of seven shift elements that can be selectively shifted to select at least seven forward gears without group shifting. The front-mounted gear set comprises a front-mounted planetary gear set or at most two non-shiftable front-mounted planetary gear sets coupled to the first front-mounted planetary gear set, wherein the rear-mounted gear set is formed as a two-carrier, four-shaft transmission having two shiftable rear-mounted planetary gear sets, and has four free shafts. The first free shaft of this two-carrier, four-shaft transmission is connected to the first shift element, the second free shaft is connected to the second and third shift elements, the third free shaft is connected to the fourth and fifth shift elements and the fourth free shaft is connected to the output shaft. For a multi-stage transmission, according to the invention, having a total of six shift elements, it is proposed to connect the third free shaft or the first free shaft of the rear-mounted gear set additionally to a sixth shift element. For a multi-stage transmission, according to the invention, having a total of seven shift elements, it is proposed to connect the third free shaft additionally to a sixth shift element D' and to connect the first free shaft additionally to a seventh shift element.

Furthermore, a multi-stage transmission having at least seven gears is described within the scope of DE 101 15 987 from the applicant. This transmission comprises the drive shaft and the output shaft, a non-shiftable front-mounted gear set and a shiftable rear-mounted gear set in the form of a two-carrier, four-shaft transmission. The front-mounted gear set comprises a first planetary gear set which offers, in addition to the input rotational speed of the drive shaft, a second rotational speed that can be selectively connected to a rear-mounted gear set. The rear-mounted gear set comprises two shiftable planetary gear sets which using the six shift elements, can shift at least seven gears, wherein two power paths are formed. Advantageously, group shiftings are always avoided for every shift procedure.

Furthermore, a nine-speed multi-stage transmission is known from DE 29 36 969; it comprises eight shift elements and four gear sets, wherein one gear set serves as a front-mounted gear set, the main gearing includes a Simpson set and a further gear set serves as the reverse gear.

Further multi-stage transmissions are known, for example, from DE 102004040597 A1, DE 102005010210 A1 and DE 102006006637 A1, which belong to the applicant.

Automatically shiftable vehicle transmissions, of the planetary design, in general, have already been described numerous times in the prior art and are continually undergoing further development and improvement. These transmissions should have a relatively simple design, in particular requiring a low number of shift elements, and avoid the need for double shifting when sequential shifting is performed, thereby ensuring that only one shift element is ever switched when shifting is performed in defined groups of gears.

SUMMARY OF THE INVENTION

The object of the present invention is to propose a multi-stage transmission of the initially described type, which has at least nine forward gears and at least one reverse gear having a sufficient transmission ratio, in which the design complexity and the overall size, in particular the overall length and the weight, are optimized, and in which efficiency is improved with respect to drag losses and gearing losses. In addition, in the multi-stage transmission according to the invention, minimal support moments should act on the shift elements. The transmission, according to the invention, should be particularly suited for a front transverse installation.

Accordingly, a multi-stage transmission, according to the invention, of a planetary design is proposed which has an input shaft and an output shaft which are disposed in a housing. In addition, at least four planetary gear sets are provided, which are preferably formed as minus gear sets, and which are designated, in the following, as the first, second, third, and fourth planetary gear sets, at least eight rotatable shafts which are designated, in the following, as the drive shaft, output shaft, third, fourth, fifth, sixth, eighth, and ninth shafts, a non-rotatable shaft which is designated in the following as the seventh shaft, and at least six shift elements comprising brakes and clutches, whose selective engagement produces different transmission ratios between the drive shaft and the output shaft, such that preferably nine forward gears and one reverse gear can be realized.

According to the invention, the first and second planetary gear sets, which are preferably designed as minus planetary gear sets, form a shiftable front-mounted gear set, and the third and fourth planetary gear sets form a main gear set.

In the multi-stage transmission according to the invention, it is provided that the carriers of the first and second planetary gear sets are coupled together via the fourth shaft which is connected to the sun gear of the third planetary gear set, the ring gear of the first planetary gear set is coupled to the sun gear of the second planetary gear set via the eighth shaft, which is detachably connectable to the drive shaft via the first clutch, and the sun gear of the first planetary gear set can be coupled to a housing of the transmission by means of the third shaft via a first brake, and is detachably connectable to the drive shaft via a second clutch, and the ring gear of the second planetary gear set can be coupled to a housing of the transmission by means of the fifth shaft via a second brake.

According to the invention, the sun gear of the fourth planetary gear set is coupled to a housing of the transmission via the seventh shaft, the sixth shaft is permanently connected to the carrier of the third planetary gear set and is detachably connectable to the drive shaft via a third clutch, and the ninth shaft is permanently connected to the ring gear of the fourth planetary gear set and is detachably connectable to the fourth shaft via a fourth clutch; according to the invention, the output shaft is permanently connected to the ring gear of the third planetary gear set and to the carrier of the fourth planetary gear set.

The planetary gear sets forming the forward-mounted gear set, viewed axially, are preferably disposed above one another, whereby all four planetary gear sets, viewed spatially axially, are limited to three gear set planes. According to an advantageous further development, in addition or as an alternative thereto, the planetary gear sets forming the main gear set are disposed above one another, viewed axially, so that all four planetary gear sets can be advantageously limited to two gear set planes, viewed spatially axially. By using this conceptual design the transmission can have a small axial dimension, so that a front-transverse installation is facilitated.

The arrangement of two planetary gear sets above one another can be facilitated, particularly, if the standard transmission ratios of the planetary gear set are sufficiently small in value.

The embodiment of the multi-stage transmission, according to the invention, results in transmission ratios that are particularly suitable for passenger vehicles, and in a significantly greater overall gear ratio spread of the multi-stage transmission, thereby improving driving smoothness and significantly reducing fuel consumption.

Furthermore, design complexity is significantly reduced with the multi-stage transmission, according to the invention, due to a low number of shift elements. Using the multi-stage transmission according to the invention, it is advantageously possible to perform a start-up using a hydrodynamic converter, an external start-up clutch, or any other suitable external start-up element. It is also conceivable to enable start-up using a start-up element integrated in the transmission. Preferably, a shift element that is actuated in the first forward gear and in the reverse gear is suitable.

Moreover, the multi-stage transmission, according to the invention, results in very good efficiency in the main drive gears with respect to drag losses and gearing losses.

Furthermore, low moments are present in the shift elements and in the planetary gear sets of the multi-stage transmission, thereby advantageously reducing wear in the multi-stage transmission. In addition, the low moments and the arrangement of the planetary gear sets make it possible to utilize correspondingly small dimensions, thereby reducing the necessary installation space and related costs. Furthermore, the rotational speeds of the shafts, shift elements, and planetary gear sets are low.

In addition, the transmission according to the invention is designed to allow adaptability to different drive train embodiments in terms of power flow direction and spatial aspects.

BRIEF DESCRIPTION OF THE DRAWINGS

The invention is described in greater detail in the following, as an example, with reference to the attached figures. They show.

DETAILED DESCRIPTION OF THE PREFERRED EMBODIMENTS

Figure 1:
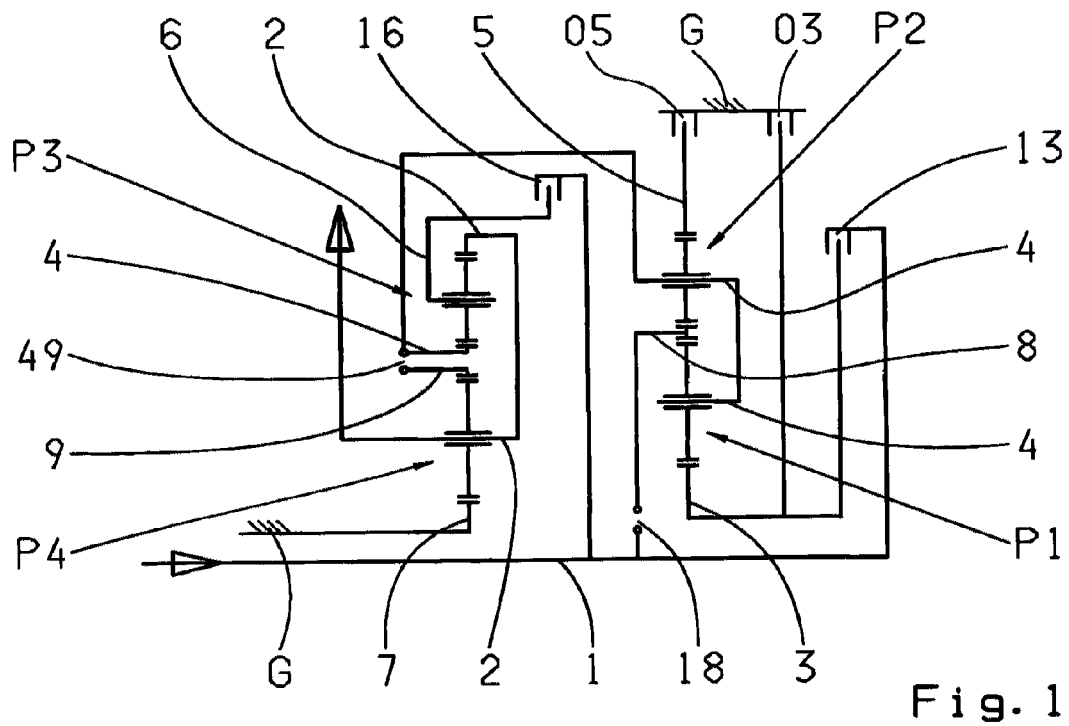
FIG. 1: a schematic view of a preferred embodiment of a multi-stage transmission according to the invention.

FIG. 1 shows a multi-stage transmission, according to the invention, which has a drive shaft 1 and an output shaft 2, which are disposed in a housing G. Four planetary gear sets P1, P2, P3 and P4 are provided, wherein the first and the second planetary gear sets P1, P2, which are preferably designed as minus planetary gear sets, form a shiftable front-mounted gear set, and wherein the third and fourth planetary gear sets P3, P4, which are preferably likewise formed as minus planetary gear sets, form the main gear set.

As shown in FIG. 1, six shift elements are provided, namely, two brakes, 03, 05, and four clutches 13, 16, 18 and 49. The spatial disposition of the shift elements can be arbitrary, and is limited only by the dimensions of the outer design.

Selective shifting of nine forward gears and one reverse gear can be realized using these shift elements. The multi-stage transmission, according to the invention, has a total of eight rotatable shafts, namely the shafts 1, 2, 3, 4, 5, 6, 8 and 9.

The multi-stage transmission, according to the invention, as depicted in FIG. 1 provides that the carriers of the first and the second planetary gear sets P1, P2 are coupled together via the shaft 4 which is connected to the sun gear of the planetary gear set P3 of the main gear set, wherein the ring gear of the first planetary gear set P1 is coupled to the sun gear of the second planetary gear set P2 via the shaft 8 which is detachably connectable to the drive shaft 1 via a clutch 18.

Furthermore, the sun gear of the first planetary gear set P1 can be coupled to a housing G of the transmission by means of the shaft 3 via a brake 03, and is detachably connectable to the drive shaft 1 via a clutch 13, and the ring gear of the second planetary gear set P2 can be coupled to a housing G of the transmission by means of the shaft 5 via a brake 05. The clutch 13 and the brake 03 preferably have a common inner lamella carrier.

Furthermore, the sun gear of the fourth planetary gear set P4 is permanently coupled to a housing of the transmission via the shaft 7, the shaft 6 is permanently connected to the carrier of the third planetary gear set P3, and is detachably connectable to the drive shaft 1 via a clutch 16, and the shaft 9 is permanently connected to the ring gear of the fourth planetary gear set P4 and is detachably connectable to the shaft 4 via the clutch 49. According to the invention, the output shaft 2 is permanently connected to the ring gear of the third planetary gear set P3, and to the carrier of the fourth planetary gear set P4.

In the embodiments shown in the accompanying figures, which are particularly suitable for a front-transverse installation, the planetary gear sets P1, P2 forming the front-mounted gear set, and the planetary gear sets forming the main gear set are each disposed above one another, viewed radially, whereby all four planetary gear sets, viewed spatially axially, are limited to two gear set planes. According to a further embodiment, the planetary gear sets, viewed axially, can be disposed in the sequence P4, P3, P2, P1.

Furthermore, as shown in FIG. 1, and shown also in the further figures, the clutch 18 and/or the clutch 49 can be designed as form locking shift elements or as claw shift elements; this is made possible by the fact that these shift elements are disengaged only during upshifts, which will be explained with reference to the description of FIG. 6. The further shift elements are preferably designed as friction shift elements.

A shown in FIG. 1, the clutches 16 and 18, viewed axially, are disposed between the main gear set and the front-mounted gear set, thereby advantageously ensuring that discernable squeaking noises caused by operating the clutch 16, which is implemented as a friction shift element, are reduced or avoided.

Figure 2:
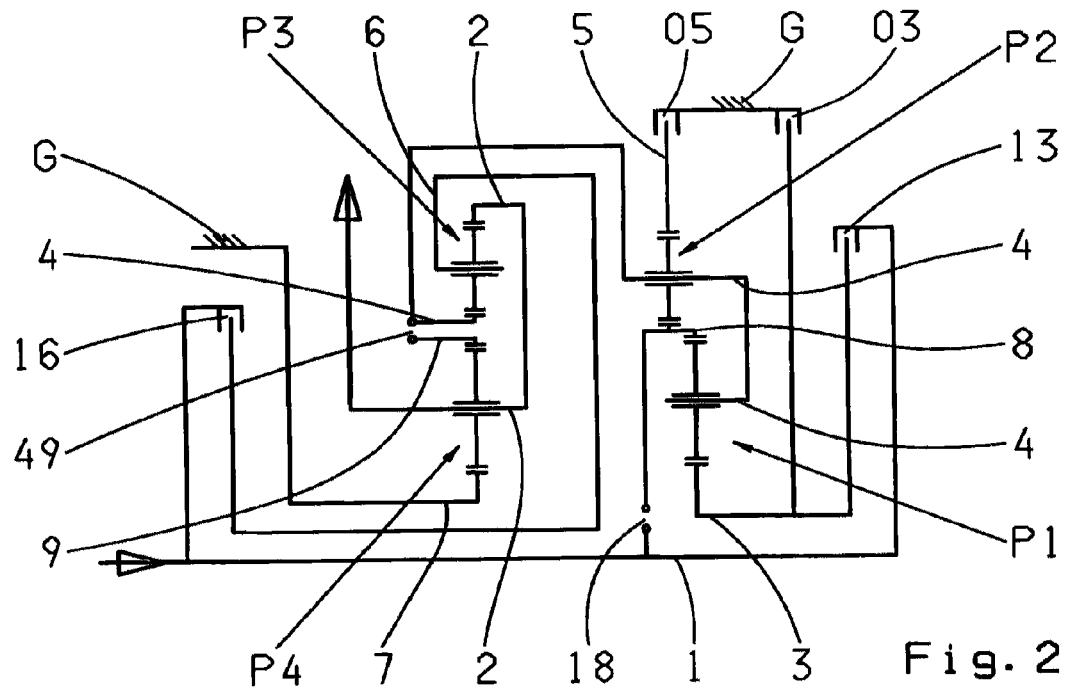
FIG. 2: a schematic view of a further preferred embodiment of a multi-stage transmission according to the invention.

The embodiment shown in FIG. 2 differs from the embodiment according to FIG. 1 in that the clutch 16, viewed axially, is disposed upstream of the main gear set in the power flow direction, thereby resulting in the sequence of clutch 16, main gear set, front-mounted gear set.

Figure 3:
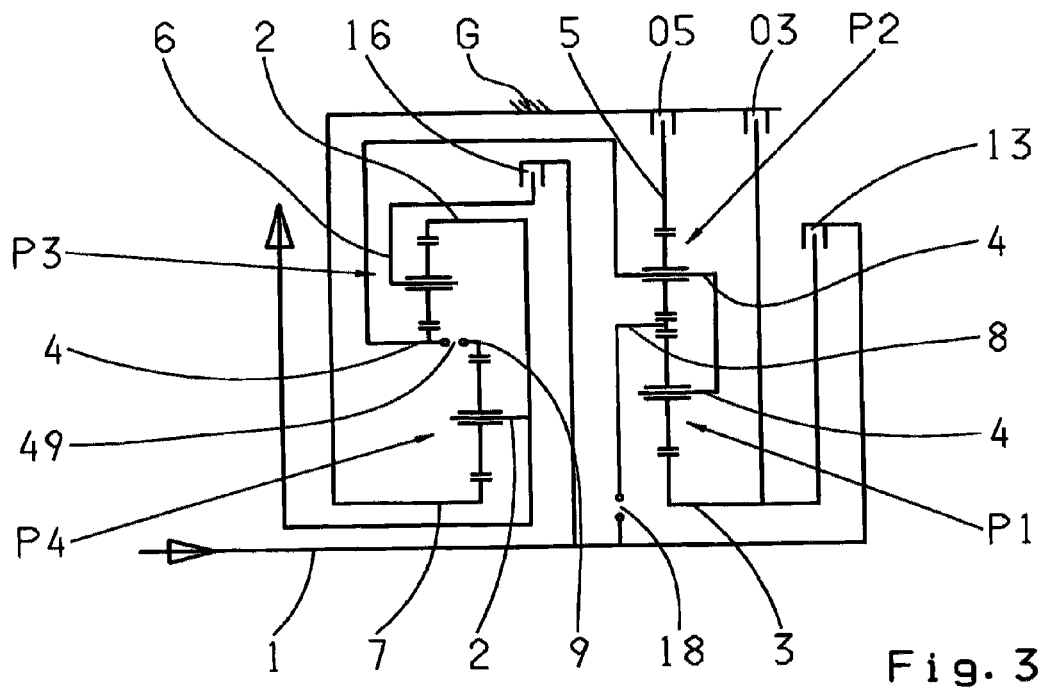
FIG. 3: a schematic view of a third preferred embodiment of a multi-stage transmission according to the invention.

A further embodiment is shown in FIG. 3 in which the clutches 16 and 18, viewed axially, are disposed between the main gear set and the front-mounted gear set, and in contrast to the transmission shown in FIG. 1, the output shaft 2 extends through the gear set P4.

Figure 4:
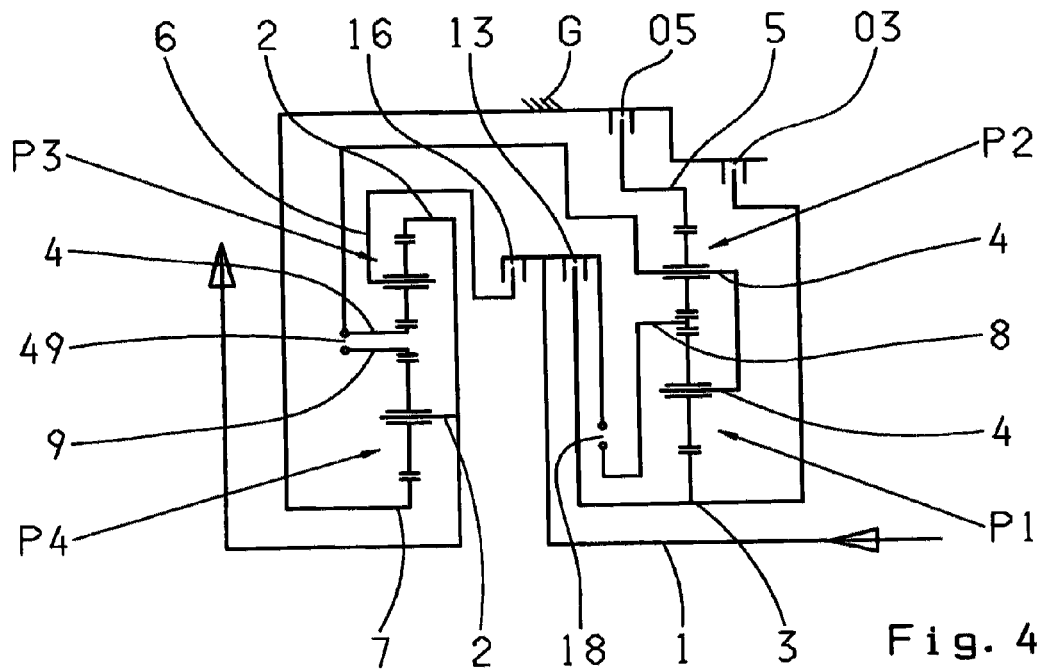
FIG. 4: a schematic view of a fourth preferred embodiment of a multi-stage transmission according to the invention.

The transmission, according to the invention, represented in FIG. 4 differs from the embodiment according to FIG. 1 in that in addition to the clutches 16 and 18, also the clutch 13, viewed axially, is disposed between the main gear set and the front-mounted gear set. If the clutches 13 and 16 are designed as lamellar shift elements, they can have a common outer lamella carrier. This arrangement significantly reduces or prevents discernible noises caused by the friction shift elements 13 and 16. Furthermore, the output shaft 2 extends through the gear set P4, as shown in FIG. 3.

Figures 5, 6:
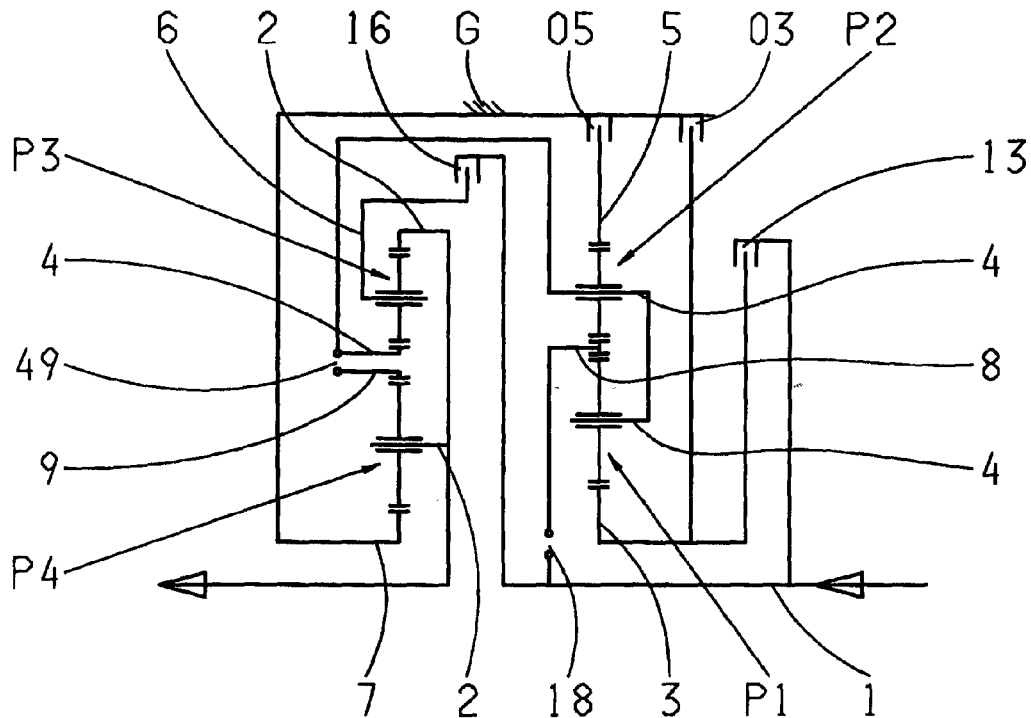
FIG. 5: a schematic view of a fifth preferred embodiment of a multi-stage transmission according to the invention.
FIG. 6: an example shifting pattern for a multi-stage transmission according to the FIGS. 1, 2, 3, 4 and 5.

A transmission, according to the invention, shown in FIG. 5, differs from the embodiment according to FIG. 3 in that it has a standard design with a co-axial input shaft and the output shaft.

FIG. 6 shows an example of a shift pattern of a multi-stage transmission according to FIGS. 1, 2, 3, 4, and 5, wherein it is assumed that the clutches 18 and 49 are implemented as claw shift elements (i.e., claw clutches). Three shift elements are engaged for every gear (with the exception of the fourth gear). The shift pattern shows, as examples, the particular transmission ratios i of the individual gear steps, the gearing efficiency η and the step changes φ. As shown in FIG. 6, the gearing efficiency η is greater than 0.98 in all forward gears.

Typical values for the stationary transmission ratios of the planetary gear sets P1, P2, P3 and P4 are −1.80, −1.62, −1.60 and −1.90, respectively. FIG. 6 shows that double shifting or group shifting is avoided when shifting sequentially since two adjacent gear steps share two shift elements. It is also shown that a large transmission ratio spread is attained with small gear increments.

Furthermore, advantageously, few friction shift elements are disengaged in the main drive gears: for example, in the eighth and ninth gear, only one friction shift element is disengaged, and two friction shift elements are not required in the fifth, six and seventh gear. This reduces the drag torques resulting from the short distance between the friction surfaces of a friction shift element in the disengaged state and the oil or air-oil mixture contained therein.

The first gear is attained by engaging the clutches 18 and 49 and the brake 05; the second gear is attained by engaging the brake 03 and the clutches 18 and 49; the third gear is attained by engaging the clutches 13, 49 and 18; and the fourth gear is attained by engaging the clutches 16 and 49. The fourth gear can only be attained by using the main gear set; according to the invention, in the fourth gear, one of the shift elements 03, 05, 13, 18 of the forward-mounted gear set can also be engaged, which then remains unloaded.

In the example shown, claw clutch 18 is selected as representative of the shift elements of the front-mounted gear set as the shift element to be engaged optionally for the fourth gear. In the fourth gear, for example, if the brake 03 is engaged along with the clutches 16 and 49, a downshift is possible from eighth gear to the fourth gear by disengaging one shift element and engaging a further shift element, and the same applies for a downshift from the ninth gear into the fourth gear, if the brake 05 is engaged along with the clutches 16 and 49.

Furthermore, the fifth gear, which is preferably designed as a direct gear, is attained by engaging the clutches 13, 16 and 18; the sixth gear is attained by engaging the brake 03 and the clutches 16 and 18; the seventh gear is attained by engaging the brake 05 and the clutches 16 and 18; the eighth gear is attained by engaging the brakes 03 and 05 and the clutch 16, and the ninth gear is attained by engaging the brake 05 and the clutches 13 and 16. As shown in the shift pattern, the reverse gear is attained by engaging the brake 05 and the clutches 13 and 49.

Since the brake 05 and the clutch 49 are engaged in the first forward gear and in the reverse gear, these shift elements (designed as friction shift elements) can be used as start-up elements.

According to the invention, different gear increments can also result from the same gear pattern depending on the shift logic, thereby making it possible to realize an application-specific or vehicle-specific variation.

It is also possible to provide additional freewheels at each suitable location of the multi-stage transmission, for example, between a shaft and the housing, or possibly to connect two shafts.

According to the invention, an axle differential and/or a distributor differential can be disposed on the drive side or on the output side.

Within the scope of an advantageous development, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch can be used as the clutch element. It is also possible to dispose such a start-up element in the power flow direction after the transmission wherein, in this case, the drive shaft 1 is continuously connected to the crankshaft of the engine.

The multi-stage transmission, according to the invention, also makes it possible to situate a torsional-vibration damper between the engine and the transmission.

Within the scope of a further embodiment of the invention, not represented, a wear-free brake, for instance, a hydraulic or electric retarder or the like, can be disposed on each shaft, preferably on the drive shaft 1 or the output shaft 2, which is of special significance for use in commercial vehicles in particular. Furthermore, a power take-off drive can be provided on each shaft, preferably on the drive shaft 1 or the output shaft 2, for driving additional assemblies.

The friction shift elements that are used can be designed as power shiftable clutches or brakes. In particular, force locking clutches or brakes can be used, for instance, lamellar clutches, band brakes, and/or cone clutches.

Figure 7:
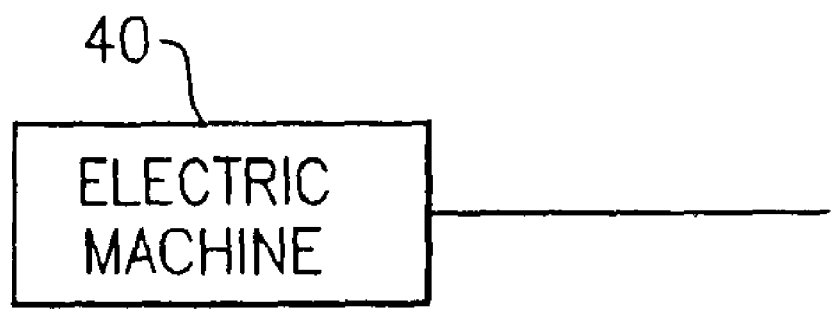
FIG. 7: a schematic view of an electric machine attached to a shaft of a multi-stage transmission.

A further advantage of the multi-stage transmission presented here in FIG. 7 is that an electric machine 40 can be attached to each shaft as a generator and/or as an additional drive machine.

Obviously, any structural embodiment, in particular any spatial disposition of the planetary gear sets and the shift elements individually and relative to each other, and insofar as it is technically expedient, falls under the scope of protection of the present claims, without influencing the function of the transmission as specified in the claims, even if these embodiments are not explicitly represented in the figures or in the description.

REFERENCE CHARACTERS

1 shaft
2 output shaft
3 shaft
4 shaft
5 shaft
6 shaft
7 shaft
8 shaft
9 shaft
03 brake
05 brake
13 clutch
16 clutch
18 clutch
40 electric machine
49 clutch
P1 planetary gear set
P2 planetary gear set
P3 planetary gear set
P4 planetary gear set
i transmission ratio
φ step change
η gearing efficiency
G housing

The invention claimed is:

1. A multi step transmission of a planetary design for an automatic transmission of a motor vehicle, the multi step transmission comprising:
a drive shaft (1);
an output shaft (2);
first, second, third and fourth planetary gear sets (P1, P2, P3, P4) disposed in a transmission housing (G), each of the first, the second, the third, and the fourth planetary gear sets (P1, P2, P3, P4) comprising a sun gear, a carrier and a ring gear;
a third rotatable shaft (3), a fourth rotatable shaft (4), a fifth rotatable shaft (5), a sixth rotatable shaft (6), a seventh rotatable shaft (8), and an eighth rotatable shaft (9);
at least six shift elements (03, 05, 13, 16, 18, 49) comprising a first brake (03), a second brake (05), a first clutch (13), a second clutch (16), a third clutch (18), and a fourth clutch (49) whose selected engagement produces different transmission ratios between the drive shaft (1) and the output shaft (2) such that nine forward gears and one reverse gear can be achieved;
the first and the second planetary gear sets (P1, P2) form a shiftable front-mounted gear set and the third and the fourth planetary gear sets (P3, P4) form a main gear set;
wherein the carriers of the first and the second planetary gear sets (P1, P2) are coupled together via the fourth shaft (4) which is connected to the sun gear of the third planetary gear set (P3);
the ring gear of the first planetary gear set (P1) is coupled to the sun gear of the second planetary gear set (P2) via the seventh rotatable shaft (8), and the seventh rotatable shaft (8) is connectable to the drive shaft (1) via the third clutch (18);
the sun gear of the first planetary gear set (P1) is connectable to the housing (G) by the third shaft (3), via the first brake (03), and is connectable to the drive shaft (1), via the first clutch (13);
the ring gear of the second planetary gear set (P2) is connectable to the housing (G) by the fifth shaft (5) via the second brake (05);
the sun gear of the fourth planetary gear set (P4) is connected by a fixed ninth shaft (7) to the housing (G);
the sixth shaft (6) is connected to the carrier of the third planetary gear set (P3) and is connectable to the drive shaft (1) via the second clutch (16);
the eighth shaft (9) is connected to the ring gear of the fourth planetary gear set (P4) and is connectable to the fourth shaft (4) via the fourth clutch (49); and
the output shaft (2) is connected to the ring gear of the third planetary gear set (P3) and to the carrier of the fourth planetary gear set (P4).

2. The multi-stage transmission according to claim 1, wherein the first, the second, the third and the fourth planetary gear sets (P1, P2, P3, P4) are disposed in the sequence of the fourth planetary gear set (P4), the third planetary gear set (P3), the second planetary gear set (P2) and the first planetary gear set (P1).

3. The multi-stage transmission according to claim 1, wherein the first and the second planetary gear sets (P1, P2), which form the front-mounted gear set, are disposed concentrically with respect to one another, when viewed axially.

4. The multi-stage transmission according to claim 1, wherein the third and the fourth planetary gear sets (P3, P4), which form the main gear set, are disposed concentrically with respect to one another, when viewed axially.

5. The multi-stage transmission according to claim 1, wherein the third clutch (18) is axially located between the main gear set and the front-mounted gear set.

6. The multi-stage transmission according to claim 5, wherein the second clutch (16) is axially located between the main gear set and the front-mounted gear set.

7. The multi-stage transmission according to claim 6, wherein the first clutch (13) is axially located between the main gear set and the front-mounted gear set.

8. The multi-stage transmission according to claim 7, wherein the first and the second clutches (13, 16) are lamellar shift elements and have a common outer lamellar carrier.

9. The multi-stage transmission according to claim 6, wherein the output shaft (2) extends through the fourth planetary gear set (P4).

10. The multi-stage transmission according to claim 1, wherein at least one of the third clutch (18) and the fourth clutch (49) is a claw shift element, and each of the first and the second clutches (13, 16) and the first and the second brakes (03, 05) is a friction element.

11. The multi-stage transmission according to claim 10, wherein a first gear is achieved by engagement of the third and the fourth clutches (18, 49) and the second brake (05);
a second gear is achieved by engagement of the first brake (03) and the third and the fourth clutches (18, 49);
a third gear is achieved by engagement of the first, the third, and the fourth clutches (13, 18, 49);
a fourth gear is achieved by engagement of the second and the fourth clutches (16, 49) and one of the first brake (03), the second brake (05), the first clutch (13), and the third clutch (18);
a fifth gear is achieved by engagement of the first, the second and the third clutches (13, 16, 18);
a sixth gear is achieved by engagement of the first brake (03) and the second and the third clutches (16, 18);
a seventh gear is achieved by engagement of the second brake (05) and the second and the third clutches (16, 18);
an eighth gear is achieved by engagement of the first and the second brakes (03, 05) and the second clutch (16); and
a ninth gear is achieved by engagement of the second brake (05) and the first and the second clutches (13, 16).

12. The multi-stage transmission according to claim 1, wherein the reverse gear is achieved by engagement of the second brake (05) and the first and the fourth clutches (13, 49).

13. The multi-stage transmission according to claim 1, wherein one of the at least six shift elements (05, 49) of the transmission is used for start-up.

14. The multi-stage transmission according to claim 1, wherein an electric machine (40) is attached, as at least one of a generator and an additional drive machine, to at least one of the drive shaft (1), the output shaft (2), the third shaft (3), the fourth shaft (4), the fifth shaft (5), the sixth shaft (6), the seventh shaft (8), and the eighth shaft (9).

15. The multi-stage transmission according to claim 1, wherein the third and the fourth planetary gear sets (P3, P4) are axially aligned in a first gear plane, and the first and the second planetary gear sets (P1, P2) are axially aligned in a second gear plane.

16. The multi-stage transmission according to claim 15, wherein the third gear set (P3) is radially arranged radially around the fourth planetary gear set (P4) and the second planetary gear set (P2) is arranged radially around the first planetary gear set (P1).

\* \* \* \* \*